United States Patent [19]
Fisker et al.

[11] 3,813,203
[45] May 28, 1974

[54] DEVICE FOR MOLDING PIPE HAVING A SPIGOT END

[75] Inventors: Jens Erik Fisker; Per Søndergaard, both of Bronderslev, Denmark

[73] Assignee: Pedershaab Maskinfabrik A/S, Bronderslev, Denmark

[22] Filed: May 24, 1972

[21] Appl. No.: 256,540

[30] Foreign Application Priority Data
June 8, 1971 Denmark ............................ 2784/71

[52] U.S. Cl. ................ 425/441, 249/152, 425/393, 425/450 R
[51] Int. Cl. ........................................... B28b 11/08
[58] Field of Search .......... 249/152, 161, 162, 173; 425/392, 393, 425, 441, 450 C, 450, DIG. 58, 119, 468

[56] References Cited
UNITED STATES PATENTS
| | | | |
|---|---|---|---|
| 2,385,147 | 9/1945 | MacDonald | 425/393 |
| 3,141,195 | 7/1964 | Haas | 425/450 C |
| 3,206,822 | 9/1965 | Pausch | 425/468 X |
| 3,341,910 | 9/1967 | Hesselholt | 425/392 |
| 3,419,649 | 12/1968 | Livingston et al. | 425/425 |
| 3,454,257 | 7/1969 | Dupuis | 249/173 X |
| 3,465,075 | 9/1969 | Siegfried | 425/393 |

Primary Examiner—R. Spencer Annear
Assistant Examiner—Mark Rosenbaum
Attorney, Agent, or Firm—Owen, Wickersham & Erickson

[57] ABSTRACT

A spigot-end shaper has an inner ring and a concentric outer ring that is slotted and is radially expandable. In molding, the inner ring shapes the end face of the spigot and the outer ring shapes the spigot's outer wall, being clamped around the inner ring. In a mold-removing position, the outer ring is freely axially displacable away from the spigot end.

2 Claims, 3 Drawing Figures

DEVICE FOR MOLDING PIPE HAVING A SPIGOT END

BACKGROUND OF THE INVENTION

This invention relates to a mold device for use in manufacturing pipes from concrete or a similarly moldable material.

In the prior art, concrete pipes have been molded in a vertical position, with the spigot end facing upwards, with the aid of an annular shaper which is forced down into the concrete mass while being vibrated. After the termination of the molding operation, the shaper has been lifted clear by a simple displacement in the direction of the axis of the pipe.

However, when it is desired to provide the spigot end with an annular groove or other parts that prevent an axial displacement of the molded pipe relative to the mold or shaper, the annular core or core ring used to form the groove is normally left behind in the pipe until this has hardened. An example of an apparatus operating on this principle is shown in U.S. Pat. No. 3,341,910. This prior art apparatus comprises a pressing cover with an outer ring and an inner ring which are concentric. In the casting position the outer ring surrounds a third ring, a separate, slotted core ring which provides the groove or channel in the spigot end of the pipe, while the inner ring serves as an abutment for the core ring when the outer ring is lifted clear of the core ring during a first phase of the mold-removing operation. The purpose is to prevent the core ring from following the outer ring during its displacement and, thereby, ripping off portions from the freshly-molded pipe at its spigot edge.

The core ring that is left behind in the pipe and which is slotted or divisible in some other way, has had to be subsequently removed manually. This increases the cost of the pipe production, since this step of removal of the core ring cannot be carried through in a fully automatic manner.

SUMMARY OF THE INVENTION

The present invention relates to a mold device for use in the manufacture of pipes from concrete or similarly moldable material, and it comprises a spigot end shaper including two concentric rings. There is an outer ring which in the molding position surrounds the spigot end of the pipe that is being molded. There is also an inner ring serving to shape the end face of the spigot. However, in this invention the outer ring is slotted and is radially expandable from the molding position, wherein this outer ring is clamped around the inner ring, into a mold-removing position, wherein the outer ring is freely axially displaceable away from the spigot end of the molded pipe. The slotted outer ring is, in itself, not of a firm shape, but it is fully stabilized in the molding position by its tight engagement with the inner ring. These two rings may be used in a conventional manner for compacting the molding material and for shaping the pipe spigot, which may further be formed with a circumferential groove or other details presenting a "reversed release" inclination to the axis of the pipe. Although the outer ring on its inner surface may have radially projecting mold parts, when the outer ring is radially expanded into its mold-removing position, these parts clear the freshly molded pipe so that the pipe can at once be completely removed from the mold.

For the purpose of holding the two rings of the mold device together, the inner ring may, on its top side, carry a plurality of projecting guide and holding pins, which extend into guiding recesses in the outer ring with mobility in both the radial and the circumferential direction, and which, in the expanded mold-removing position of the outer ring, are in contact with the radially inner wall of the recesses. It is thereby possible to ensure such a guiding of the outer ring during its expansion into the mold-removing position, that this ring is progressively disengaged from the freshly-poured concrete along the full circumference of the pipe. Such a progressive release of the outer ring counteracts the formation of suction cavities or other defects which occur when portions of the freshly poured concrete adhere to the outer ring, in particular at sharp edges in the freshly-molded pipe. Moreover, the pins and the associated guiding recesses ensure that the outer ring, so long as it is in its mold-removing position, is not disengaged from the inner ring.

The readjustment of the mold device between the molding position and the mold-removing position can be carried out in different ways. According to the invention it is preferred that the outer ring, on each side of its slot, is connected to the lowermost end of a pair of substantially vertical operating arms that are, at the top, mounted pivotably in a frame which is rigidly connected to the inner ring. A mechanism such as a double-action cylinder may be inserted between the arms for swinging them towards and away from each other. Such a mechanism for opening and closing the outer ring may require little space and will be well-suited for automatic operation concurrently with the other pipe-manufacturing operations.

When a pipe is produced in an ordinary vibrated mold consisting of an external mold part and a core, the freshly molded pipe will, when being removed from the external and internal mold parts, tend to shrink longitudinally. In order to avoid the formation of cracks in the pipe spigot in such a case, the frame of the mold device, according to the present invention, may expediently be mounted in such a way that the rings of the mold device, while in the molding position, are able to follow the shrinking of the pipe during its removal from the mold. Such a movable mounting of the frame also enables the rings to follow any possible lopsided settling or shrinking of the pipe.

Other objects and advantages of the invention will become apparent from the following description of a preferred embodiment of the mold device.

DESCRIPTION OF A PREFERRED EMBODIMENT

Figure 3:
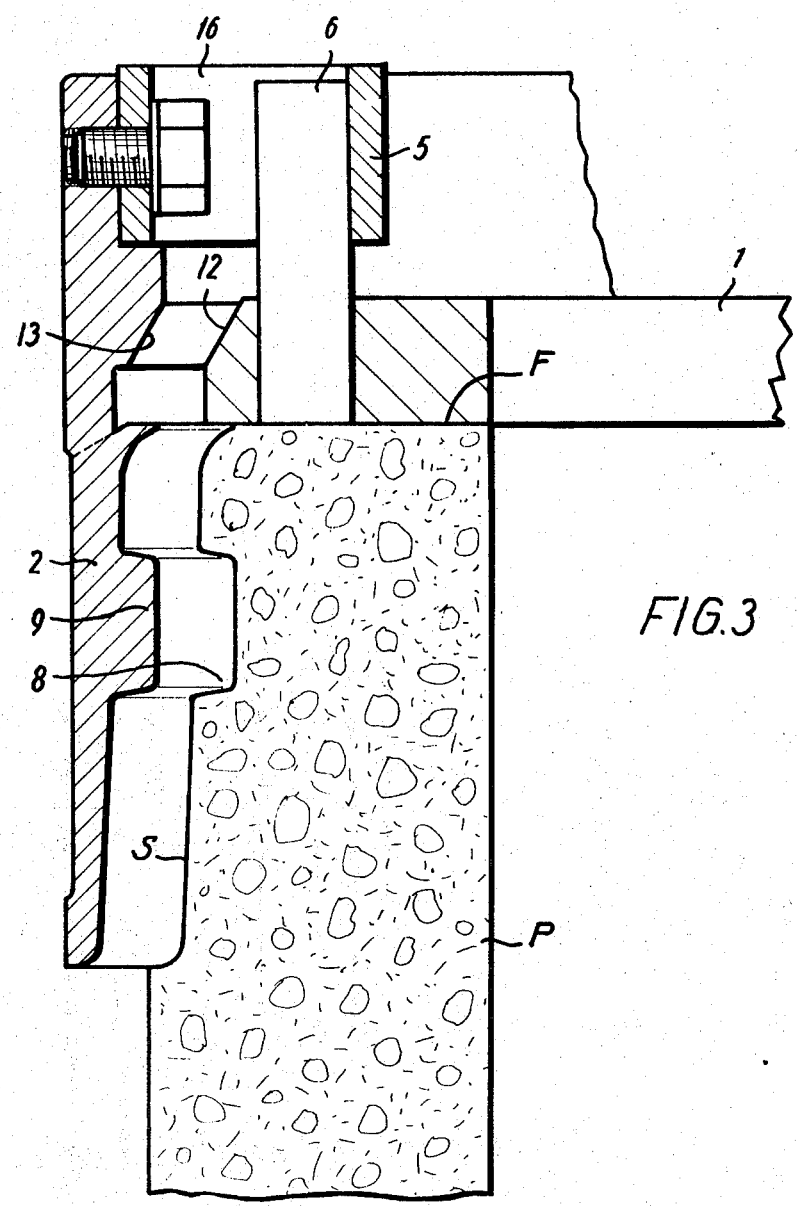
FIG. 3 is an enlarged fragmentary view in section taken along the line III—III of FIG. 2.

The mold device as illustrated comprises a rigid circular inner ring 1 which, as illustrated in FIG. 3, serves to shape the spigot end face F of the concrete pipe P to be molded. In combination with the inner ring is a slotted outer ring 2 that surrounds the pipe spigot end S and determines its external shape. In this example, the spigot S includes a circumferential groove 8 corresponding to a radial annular projection 9 on the inside of the outer ring 2.

Figure 1:
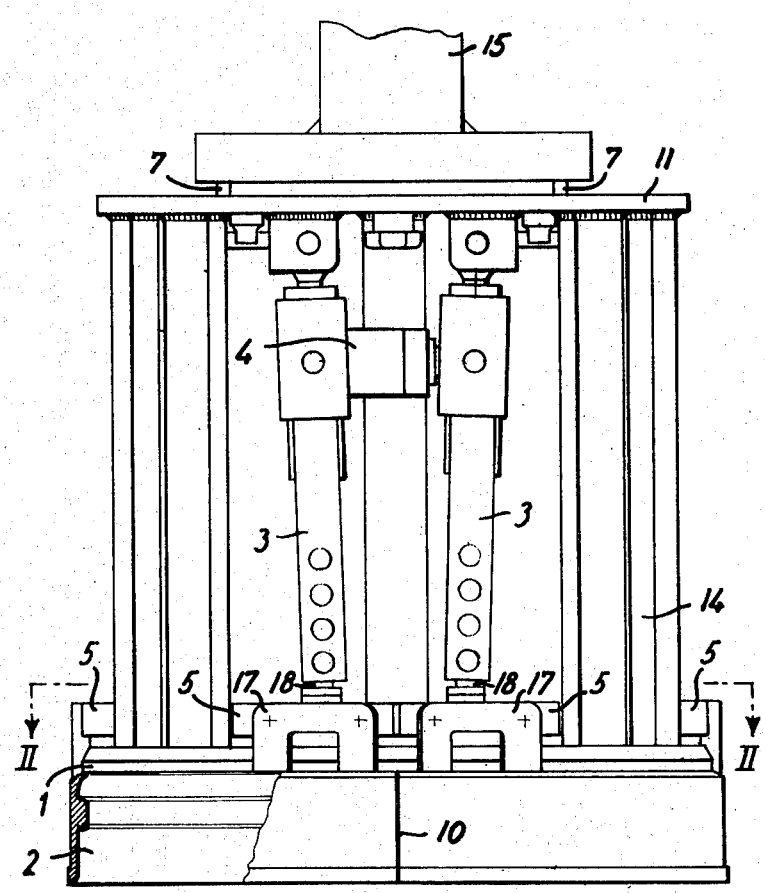
FIG. 1 is a view in side elevation, partly in section along the line I—I of FIG. 2, showing a mold device embodying the principles of the present invention in the molding position.
Figure 2:
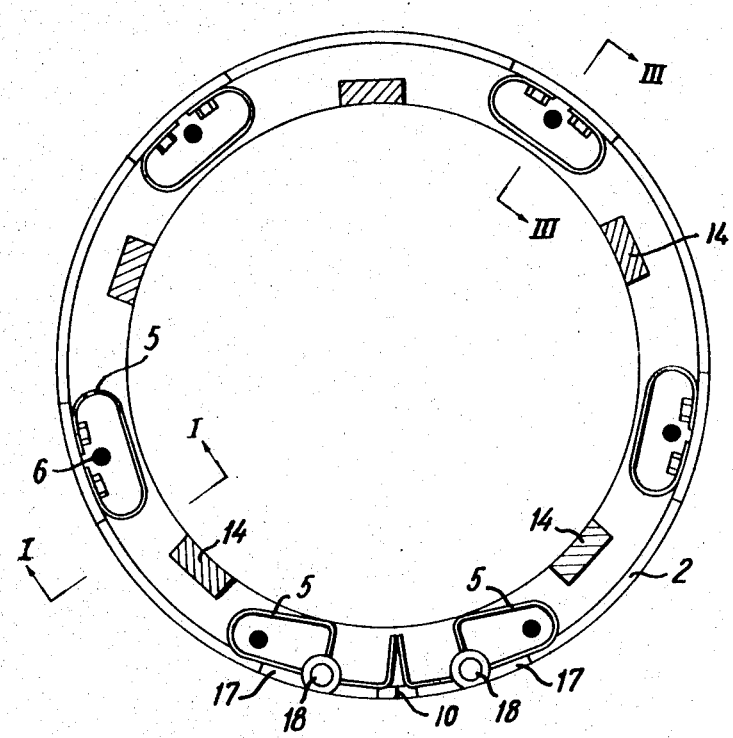
FIG. 2 is a view in horizontal section taken along the line II—II of FIG. 1.

In the molding position of the mold device, as shown in FIG. 1, the outer ring 2 is clamped around the inner ring 1 so that the slot 10 (see FIGS. 1 and 2) of the outer ring 2 is at least substantially closed. In the embodiment shown, the outer ring 2 is kept in this position by means of a pair of approximately vertical arms 3, the lowermost extremities of which are each connected through a U-shaped member 17 with a hinge point 18 to one end of the outer ring 2 and which, at the top, are pivotably mounted in a frame plate 11. Between the two arms 3, a pneumatic cylinder 4 is inserted, which via the arms 3 may operate to open and close the outer ring 2. In the closed position, the shape of outer ring 2 is stabilized by contact of a guide face 13 (FIG. 3) with a guide face 12 on the inner ring 1.

It is possible, in the closed position, to use the assembled rings 1 and 2 in the normal way for compacting the concrete or other molding material in a mold (not shown) having an external mold part and an internal part or core. Subsequent to the molding operation, these mold parts are removed in the normal manner, whereupon the cylinder 4 is activated so as to radially expand the outer ring 2. Thus, starting from the slot 10, the ring 2 is progressively disengaged or released from the freshly molded pipe along the entire circumference thereof. During this step the outer ring 2 is guided in relation to the inner ring 1 by means of a plurality of guide stirrups 5 located on the inside of the outer ring 2 and forming guide recesses 16 into which engage a series of guide pins 6 projecting from the top side of the inner ring 1. In the fully open position, FIG. 3, the outer ring 2 is stabilized in relation to inner ring 1 by firm contact between the stirrups 5 and guide pins 6 and, in this position, the entire device can be lifted upwards from the freshly-molded concrete pipe P, after which it is possible to initiate a new operation by the outer ring 2 being clamped around the inner ring 1 by means of the compressed air cylinder 4.

By means of a circular series of approximately vertical rods 14, the inner ring 1 is carried by a frame plate 11 which, in its turn, by means of short straps 7 is suspended from a piston 15 that is vertically displaceable, so that rings 1 and 2, as explained in the foregoing, are able to follow any shrinkage of the freshly-molded concrete pipe P.

To those skilled in the art to which this invention relates, many changes in construction and widely differing embodiments and applications of the invention will suggest themselves without departing from the spirit and scope of the invention. The disclosures and the description herein are purely illustrative and are not intended to be in any sense limiting.

We claim:

1. A mold device for use in molding from concrete and similarly moldable material pipes having a spigot at one end, said mold device comprising
    a spigot-end shaper including concentric inner and outer rings, the outer ring being unitary and in the molding position surrounding the spigot end of the pipe that is being molded and the inner ring serving to shape the end face of the spigot,
    said outer ring being slotted and radially expandable, so that in a molding position said outer ring can be clamped around the inner ring, and in a mold-removing position said outer ring is freely axially displaceable away from the spigot end of the molded pipe,
    a frame rigidly connected to said inner ring, and
    a pair of substantially vertical operating arms having upper ends mounted pivotably in said frame and having a lowermost end connected to said outer ring, on each side of its slot.

2. A mold device for use in molding from concrete and similarly moldable material pipes having a spigot at one end, said mold device comprising
    a spigot-end shaper including concentric inner and outer rings, the outer ring being unitary and in the molding position surrounding the spigot end of the pipe that is being molded and the inner ring serving to shape the end face of the spigot,
    said outer ring being slotted and radially expandable, so that in a molding position said outer ring can be clamped around the inner ring, and in a mold-removing position said outer ring is freely axially displaceable away from the spigot end of the molded pipe, said outer ring having a plurality of guiding recesses,
    said inner ring, at its top side, carrying a plurality of projecting guide and holding pins which, with mobility in both the radial and the circumferential direction, extend into guiding recesses in said outer ring and which, in the expanded mold-removing position of said outer ring, are in contact with the radially inner wall of said recesses,
    a frame rigidly connected to said inner ring, and
    a pair of substantially vertical operating arms having upper ends mounted pivotably in said frame and having a lowermost end connected to said outer ring, on each side of its slot.

* * * * *